(12) United States Patent
Gillis et al.

(10) Patent No.: US 6,246,534 B1
(45) Date of Patent: Jun. 12, 2001

(54) HARD DISK DRIVE WITH LUBE ON DEMAND ACTUATORS

(75) Inventors: Donald Ray Gillis, San Jose; Mike Suk, Milpitas, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/179,686

(22) Filed: Oct. 27, 1998

(51) Int. Cl.$^7$ .................................................. G11B 21/02
(52) U.S. Cl. ......................................... 360/75; 360/254.8
(58) Field of Search .............................. 360/254.7, 254.8, 360/255.6, 255.7, 255.3, 255.8, 255.9, 69, 75

(56) References Cited

U.S. PATENT DOCUMENTS

| | | |
|---|---|---|
| 4,686,592 | 8/1987 | Carroll et al. . |
| 5,237,477 * | 8/1993 | Hodapp et al. ...................... 360/128 |
| 5,394,281 | 2/1995 | Kajitani . |
| 5,408,375 | 4/1995 | Asano . |
| 5,585,980 | 12/1996 | Bouaghou . |
| 5,644,451 | 7/1997 | Chan et al. . |
| 5,663,846 * | 9/1997 | Masuoka et al. ...................... 360/75 |
| 6,091,576 * | 7/2000 | Eckerd et al. ................... 360/254.8 |

FOREIGN PATENT DOCUMENTS 06215435   5/1994   (CA) .

OTHER PUBLICATIONS

Jun. 1995 IBM Technical Bulletin (Slider Load/Unload Ramp For Magentic Recording Files).

* cited by examiner

*Primary Examiner*—David Hudspeth
*Assistant Examiner*—Kim Wong
(74) *Attorney, Agent, or Firm*—Robert B. Martin; Bracewell & Patterson, L.L.P.

(57) ABSTRACT

A hard disk drive contains magnetic disks which are accessed by a series of pivotable arms. Each arm has a pair of flexible, cantilevered suspensions and a head gimbal assembly with a magnetic read/write head secured to each suspension. A tab extends from and forms part of the end of each head gimbal assembly. The hard disk drive also has a stationary cam member located near the outer edges of the disks. The cam member has a series of rigid cantilevered fingers with contoured surfaces. Each surface has three spaced-apart detents with a recess located between each adjacent pair of detents. The second recess on each surface has a lubricant-filled reservoir. For the majority of its operation, the drive pivots the arms between an operational range adjacent to the disks, and a park position in the first recess when the drive is not in use. The tabs slide along the support surfaces of the fingers when the arms move to the retracted position. At selected intervals, the support surfaces of the fingers may be lubricated by briefly moving the arms to a lube position with the tabs in the second recess. The small amount of lubricant applied to the tabs is sufficient to relubricate the support surfaces of the fingers as the tabs slide on the fingers for a number of cycles.

17 Claims, 2 Drawing Sheets

HARD DISK DRIVE WITH LUBE ON DEMAND ACTUATORS

TECHNICAL FIELD

This invention relates in general to hard disk drives and in particular to a hard disk drive with lube on demand actuators.

BACKGROUND ART

Magnetic recording files, such as hard disk drives, are commonly known in the art. Hard disk drives typically employ a plurality of magnetic read/write heads on the end of movable suspension actuator arms to read/write with magnetic disks. Some hard disk drives are required to withstand high G-force impacts and a large number of start/stop cycles. The drives also must unload the heads off the disk surfaces to prevent damage to the system.

One solution to this problem is to provide a off-loading ramp near the outer edge of each of the disks for engaging the actuator arms. Each ramp is positioned so that when the head is moved past the outer diameter of the disk, the head moves off of the disk and onto the stationary ramp. The ramps may be formed from materials which will not shed particles and may be lubricated to prevent ramp wear. The ramps also may have narrow rails formed to reduce static friction and hold the arms in place when they are retracted from the disks.

One prior art device, U.S. Pat. No. 5,408,375, provides a ramp with a cam surface or detent to retain the arm after it is retracted. The ramp has a groove on an opposite side of the detent adjacent to the holding position of the arm when it is retracted. The groove is provided for containing a lubricant which lubricates the arm each time it is retracted. When the arm moves the head back onto the disk, the ramp is lubricated to reduce wear. Although this design is workable, the ramp does not require lubrication for every arm retraction. Excessive lubrication of the ramp causes the lubricant to overmigrate, which can interfere with the operation of or damage the hard disk drive. An improved ramp design with selective lubrication capability is needed.

DISCLOSURE OF THE INVENTION

A hard disk drive contains magnetic disks which are accessed by a series of pivotable arms. Each arm has a pair of flexible, cantilevered suspensions and a head gimbal assembly with a magnetic read/write head secured to each suspension. A tab extends from and forms part of the end of each head gimbal assembly. The hard disk drive also has a stationary cam member located near the outer edges of the disks. The cam member has a series of rigid cantilevered fingers with contoured surfaces. Each surface has a three spaced apart detents with a recess located between each adjacent pair of detents. The second recess on each surface has a lubricant-filled reservoir.

For the majority of its operation, the drive pivots the arms between an operational range adjacent to the disks, and a park position in the first recess when the drive is not in use. The tabs slide along the support surfaces of the fingers when the arms move to the retracted position. At selected intervals, the support surfaces of the fingers may be lubricated by briefly moving the arms to a lube position with the tabs in the second recess. The small amount of lubricant applied to the tabs is sufficient to relubricate the support surfaces of the fingers as the tabs slide on the fingers for a number of cycles.

BEST MODE FOR CARRYING OUT THE INVENTION

Figure 1:
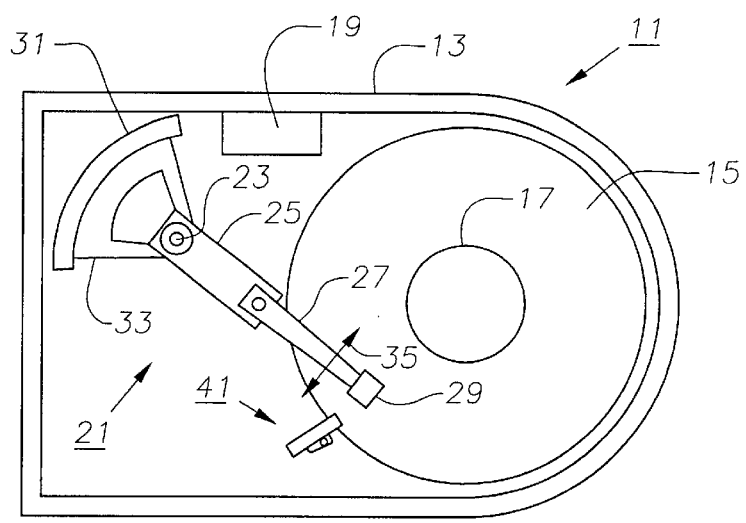
FIG. 1 is a top schematic view of a hard disk drive constructed in accordance with the invention.

Referring to FIG. 1, a schematic drawing of an information storage system comprising a magnetic hard disk drive 11 is shown. Drive 11 has an outer housing or base 13 containing a plurality of stacked, parallel magnetic disks 15 (one shown) which are closely spaced apart. Disks 15 are rotated by a motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 as will be described below.

In the embodiment shown, each arm 21 comprises a mounting support 25, a pair of parallel, cantilevered load beams or suspensions 27 extending from mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Movement of an actuator drive arm 33 (indicated by arrow 35) moves head gimbal assemblies 29 radially across tracks on the disks 15 until the heads on assemblies 29 settle on the target tracks.

Figure 2:
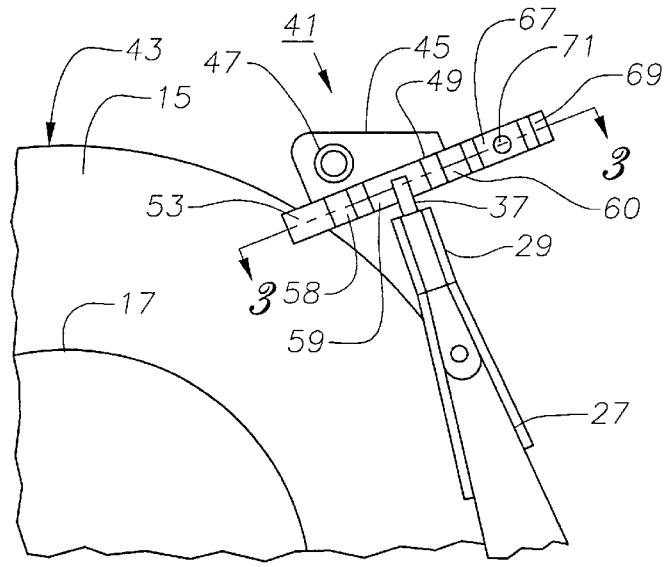
FIG. 2 is an enlarged top view of a portion of the hard disk drive of FIG. 1.
Figure 3:
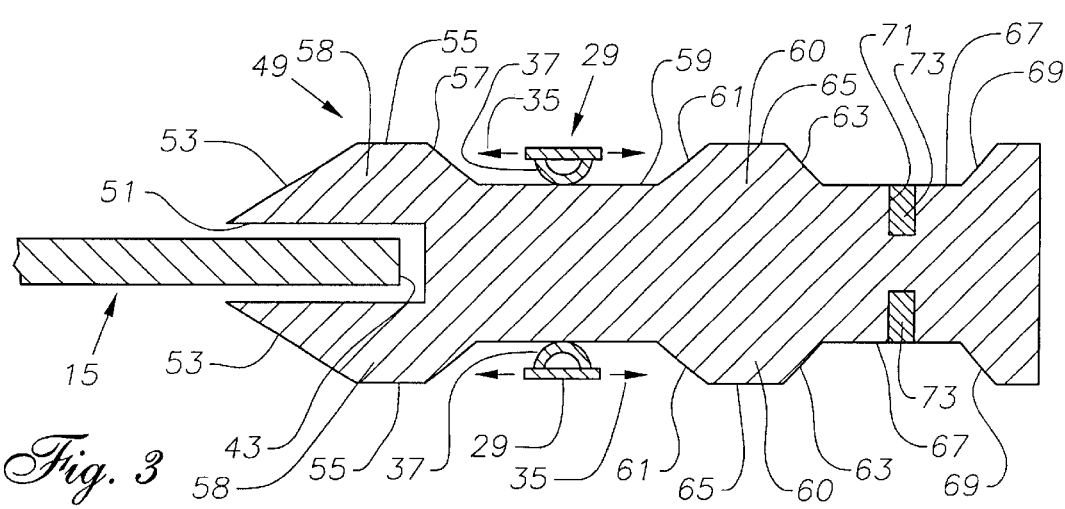
FIG. 3 is a sectional side view of a portion of the hard disk drive of FIG. 1 taken along the line 3—3 of FIG. 2.

Referring now to FIGS. 2 and 3, a tab 37 extends from the end of and forms a part of each head gimbal assembly 29. Each tab 37 has a convex, semi-circular shape when viewed from the end (FIG. 3). Drive 11 also has a stationary cam member 41 located near and slightly overlapping the outer edges 43 of disks 15. Cam member 41 has a perpendicular flange 45 on a lower end (FIG. 2) which is joined to base 13 with a fastener 47. Cam member 41 also has a stack of narrow, elongated, cantilevered fingers 49. Each finger 49 extends rigidly from cam member 41 and has a rectangular slot 51 on its unsupported end (one shown in FIG. 3). Each slot 51 closely receives but does not touch the outer edge 43 of one disk 15.

In the embodiment shown, each finger 49 has upper and lower surfaces with a symmetrical profile when viewed from the side (FIG. 3). The upper and lower surfaces of fingers 49 are symmetrical to accommodate the upper and lower suspensions 27 (FIG. 3) on a single actuator arm 21 in an identical manner. Each surface of each finger 49 has an inclined surface 53 at its unsupported or inner end which levels off into a horizontal platform 55. The opposite sides of platforms 55 transition into a tapered surface 57 before leveling off into a horizontal recess 59. Together, surfaces 53, 55 and 57 form an inner protrusion or detent 58. A second or intermediate detent 60 is similarly formed by inclined surfaces 61, 63 and a horizontal platform 65. A second horizontal recess 67 is located on the opposite side of the second detent 60. An inclined crash stop 69 is located opposite of inclined surface 63 and is part of an outer protrusion. Each recess 67 on each finger 49 contains a shallow groove or reservoir 71 which extends for a shallow depth into finger 49. A viscous lubricant fills each reservoir 71 and is retained via capillary action.

In operation, disks 15 are rotated by the motor at a high speed about central drive hub 17. Arms 21 are pivoted along arrows 35 to place the heads on head gimbal assemblies 29 into various operational positions (FIG. 1) within an operational range on disks 15. The two head gimbal assemblies 29 mounted to the end of each arm 21 operate in a conventional manner and always move in unison with one another on opposite sides of a single disk 15.

Arms 21 may be moved to the nonoperational positions (FIGS. 2 and 3) when not in use. For arms 21 to move from the operational range to the nonoperational positions, they must move outward away from the rotational axis of disks 15 until their tabs 37 gently strike inclined surfaces 53. At that point, the cantilevered suspensions 27 will flex slightly, thereby allowing tabs 37 to slide along the support surfaces of fingers 49. The spring-like resilience of suspensions 27 allows tabs 37 to maintain contact with surfaces 53, 55, 57 until tabs 37 come to rest in recesses 59 in the retracted or parked position. In essence, arms 21 are "parked" in recesses 59 when not in use. For the majority of its operation, drive 11 will only move arms 21 between the operational range and the retracted or parked position at recesses 59.

At selected intervals, fingers 49 of cam member 41 will be in need of lubrication to reduce wear on their support surfaces. The intervals may be based upon a predetermined number of cycles between the operational range and the retracted position, a selected time interval, or other criteria. Drive 11 is able to selectively lubricate or "lube on demand" by moving arms 21 to a lube position located at recess 67. Arms 21 move to the lube position in the same manner that they move to the retracted position. Arms 21 may move to the lube position after being parked in the retracted position, or continuously all the way from the operational range. In either case, tabs 37 will perform in the same manner. As arms 21 move toward the lube position from recesses 59, the cantilevered suspensions 27 flex to allow tabs 37 to slide along and maintain contact with surfaces 61, 65, 63 until tabs 37 come to rest in recesses 67 in the lube position. Tabs 37 need only touch the lubricant 73 in grooves 71 momentarily before sliding back inward toward disks 15. Tabs 37 may also sweep in back and forth in recesses 67 several times or between recesses 59 and 67 several times to pick up a desired amount of lubrication. The lubricant 73 applied to tabs 37 is sufficient to relubricate the support surfaces of fingers 49 for a number of cycles. Since tabs 37 do not touch disks 15, the lubricant 73 is never accidentally applied to disks 15. This process may be repeated as needed.

Figure 4:
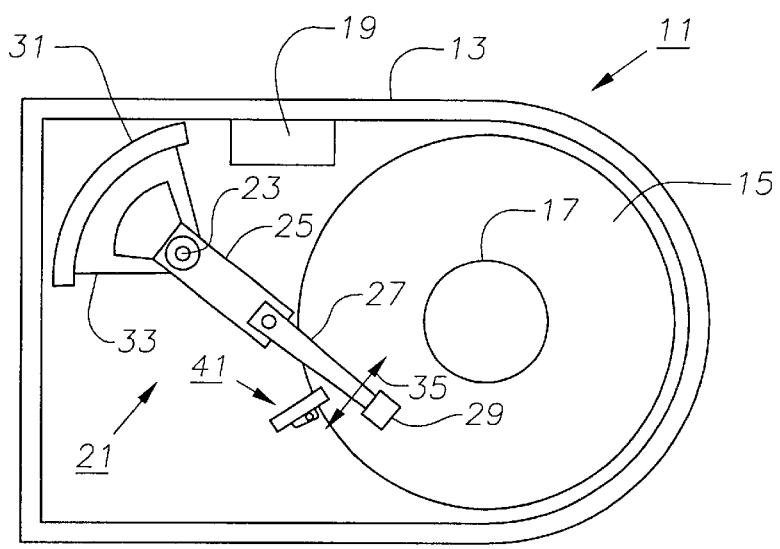
FIG. 4 is a top schematic view of a second embodiment of the hard disk drive of FIG. 1.
Figure 5:
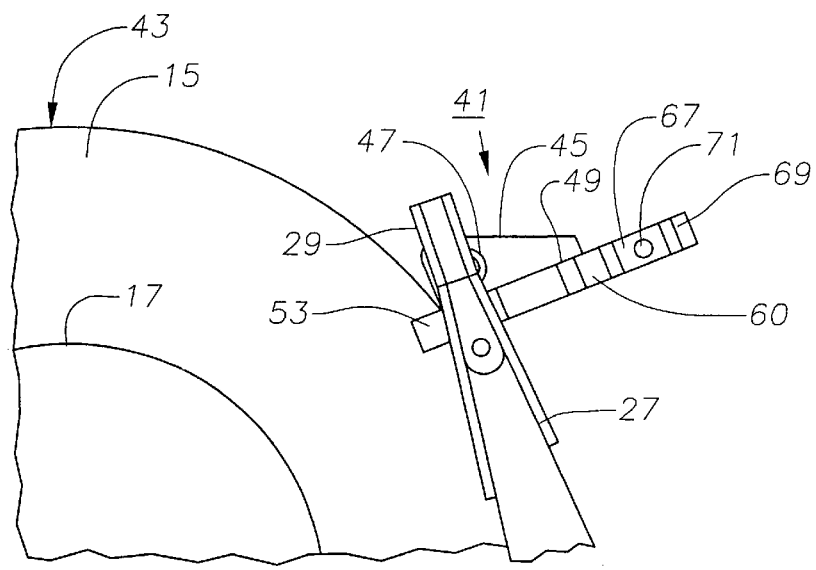
FIG. 5 is an enlarged top view of a portion of the hard disk drive of FIG. 4.

Referring now to FIGS. 4 and 5, an alternative location for cam member 41 is shown. Rather than being located at the end of head gimbal assemblies 29, cam member 41 may be positioned along the length of suspension 27. In the embodiment shown, cam member 41 is located near the midpoint of suspension 27. Tab 37 (not shown) has also been relocated to the lower surface of suspension 27 and it retains its convex, semicircular shape. Every other feature of hard disk drive 11 is identical and its operation remains unchanged from the previous description.

The invention has several advantages. Each head gimbal assembly is provided with a reservoir of lubricant which may be selectively engaged as needed to reduce wear. Unlike prior art devices, the lubricant is not applied with every actuator arm retraction. This feature avoids excessive lubrication of the cam member which prevents the lubricant from migrating and damage to the hard disk drive.

While the invention has been shown or described in only some of its forms, it should be apparent to those skilled in the art that it is not so limited, but is susceptible to various changes without departing from the scope of the invention. For example, although the present invention is described for use in a magnetic disk storage system, the invention is also applicable to other information storage systems such as an optical data storage system or a magnetic tape recording system.

We claim:

1. A hard disk drive, comprising:
   a base;
   a motor mounted to the base;
   a magnetic disk rotatably mounted on the motor;
   an actuator arm having a magnetic head for magnetically reading data from or magnetically writing data to the disk, the actuator arm being pivotally mounted to the base for movement (i) in an operational range wherein the head is adjacent to the disk, (ii) to a park position wherein the head is located away from the disk, and (iii) to a lube position wherein the head is also located away from the disk; and
   a platform mounted to the base adjacent to the magnetic disk, the platform having a park location that supports the arm while in the park position wherein the arm is free of contact with a lubricant, and a lube location that is spaced-apart from the park location and contains the lubricant, the lube location supporting and lubricating the arm while it is in the lube position.

2. The hard disk drive of claim 1, further comprising a slidable member mounted to the arm for contacting the platform.

3. The hard disk of claim 1 wherein each of the locations comprises a recess.

4. The hard disk drive of claim 1 wherein the platform is located adjacent to an outer diameter of the disk.

5. The hard disk drive of claim 1 wherein the platform comprises a cantilevered finger having a support surface containing the park and lube locations, and wherein the arm continuously maintains contact with the support surface of the finger whenever the arm moves away from the disk.

6. The hard disk drive of claim 1 wherein the lubricant is located in a reservoir extending into the platform.

7. The hard disk drive of claim 1 wherein the platform has an inclined surface which overlaps an outer edge of the disk for facilitating movement of the arm between the operational range and the park and lube positions.

8. The hard disk drive of claim 1, further comprising a flexible suspension mounted to the arm which biases the head toward the platform.

9. The hard disk drive of claim 1 wherein the lube location is located further away from the disk than the park location.

10. A hard disk drive, comprising:
    a base;
    a motor mounted to the base;
    a magnetic disk rotatable mounted on the motor;
    an actuator arm having a magnetic head for magnetically reading data from or magnetically writing data to the disk, the actuator arm being pivotally mounted to the base for movement (i) in an operational range wherein the head is adjacent to the disk, (ii) to a park position wherein the head is located away from the disk, and (iii) to a lube position wherein the head is also located away from the disk;

a platform mounted to the base adjacent to the magnetic disk, the platform having a park location that supports the arm while in the park position, and a lube location that is spaced-apart from the park location and contains a lubricant, the lube location supporting and lubricating the arm while it is in the lube position; and a controller mounted to the base for moving the arm between the operational range and the park position, and for moving the arm to the lube position at selected intervals that are a function of the number of times that the arm is in the park position.

11. A hard disk drive, comprising:

a base;

a motor mounted to the base;

a magnetic disk rotatably mounted on the motor;

an actuator arm having a magnetic head for magnetically reading data from or magnetically writing data to the disk, the actuator arm being pivotally mounted to the base for movement (i) in an operational range wherein the head is adjacent to the disk, (ii) to a park position wherein the head is located away from the disk, and (iii) to a lube position wherein the head is also located away from the disk;

a platform mounted to the base adjacent to the magnetic disk, the platform having a park location that supports the arm while in the park position, and a lube location that is spaced-apart from the park location and contains a lubricant, the lube location supporting and lubricating the arm while it is in the lube position; and inner, intermediate and outer protrusions on the platform, and wherein the park location is between the inner and intermediate protrusions, and the lube location is between the intermediate and outer protrusions.

12. A hard disk drive, comprising:

a base;

a motor mounted to the base;

a magnetic disk rotatably mounted on the motor about an axis of rotation;

an actuator arm having a flexible suspension with a magnetic head assembly for magnetically reading data from or magnetically writing data to the disk, the actuator arm being pivotally mounted to the base for movement (i) in an operational range wherein the head is adjacent to the disk, (ii) to a park position wherein the head is located away from the disk, and (iii) to a lube position wherein the head is also located away from the disk;

inner, intermediate and outer protrusions on the platform, and wherein the park location is between the inner and intermediate protrusions, and the lube location is between the intermediate and outer protrusions; and a controller mounted to the base for moving the arm between the extended and retracted positions, and for moving the arm to the lube position at selected intervals to apply lubricant to the arm, the intervals being less than the number of times the controller moves the arm to the park position.

13. The hard disk drive of claim 12 wherein the platform comprises a cantilevered finger having a support surface containing the park and lube locations, and wherein the arm maintains continuous contact with the support surface of the finger whenever the arm moves away from the disk.

14. The hard disk drive of claim 12 wherein the lubricant is located in a reservoir extending into the platform.

15. The hard disk drive of claim 12 wherein the inner protrusion has an inclined surface which overlaps an outer edge of the disk for facilitating movement of the arm between the operational range and the park and lube positions.

16. A method for lubricating an actuator arm in a hard disk drive having a base, a motor mounted to the base, a magnetic disk rotatably mounted on the motor, and a magnetic head assembly mounted to the actuator arm for magnetically reading data from or magnetically reading data to the disk, the actuator arm being pivotally mounted to the base for movement in an operational range wherein the head assembly is maintained adjacent to the disk, comprising:

(a) providing a platform adjacent to the disk, the platform having a park location and a lube location that is spaced apart from the park location and contains a lubricant;

(b) selectively moving the arm outside of the operational range and supporting the arm in the park location such that the arm is free of contact with the lubricant; and (c) at selected intervals moving the arm outside of the operational range and applying lubricant to the arm at the lube location, then sliding the arm across the platform to apply lubricant from the arm to the platform.

17. The method of claim 16 wherein step (b) and step (c) further comprise continuously maintaining contact between the arm and platform whenever the arm is outside of the operational range.

* * * * *